United States Patent [19]

Hozumi et al.

[11] 3,883,616

[45] May 13, 1975

[54] PROCESS FOR PREPARING RUBBER-CONTAINING STYRENE RESINS

[75] Inventors: Yukio Hozumi; Saizo Ikeda, both of Osaka; Toshikazu Hayaoka, Saitama, all of Japan

[73] Assignee: Daicel Ltd., Osaka, Japan

[22] Filed: May 1, 1973

[21] Appl. No.: 356,145

[30] Foreign Application Priority Data

May 4, 1972  Japan.............................. 47-44331

[52] U.S. Cl............................................ 260/880 R
[51] Int. Cl. ............................................ C08f 7/02
[58] Field of Search .............................. 260/880 R

[56] References Cited
FOREIGN PATENTS OR APPLICATIONS 856,333  11/1970  Canada .............................. 260/880

*Primary Examiner*—Harry Wong Jr
*Attorney, Agent, or Firm*—Woodhams, Blanchard & Flynn

[57] ABSTRACT

Rubber-containing styrene resins are obtained by a bulk-suspension, two stage polymerization process in which in the bulk polymerization stage, the polymerization liquid is continuously circulated through a shear zone at a rate of from 4 to 36 circulations per minute and the circulating liquid in the shear zone is subjected to an average shear rate of from 40 to 450 sec.$^{-1}$.

8 Claims, 3 Drawing Figures

PROCESS FOR PREPARING RUBBER-CONTAINING STYRENE RESINS

BACKGROUND OF THE INVENTION

1. Field of the Invention

This invention relates to an improvement in or relating to a process for performing polymerization under bulk polymerization conditions by dissolving from 2 to 20 parts by weight of a synthetic rubber, such as polybutadiene or butadiene-styrene copolymer rubber, in 100 parts by weight of a monovinyl aromatic monomer or a monomer mixture of a monovinyl aromatic monomer and a monomer copolymerizable therewith. More particularly, the invention relates to an improvement in or relating to the bulk polymerization step of a known bulk-suspension, two stage polymerization process for the preparation of a rubber-containing copolymer, such as ABS resin.

2. Description of the Prior Art

In the preparation of ABS resin by bulk-suspension polymerization, for example, in the bulk polymerization of a solution of rubberyl,3-diene polymer in a monovinyl aromatic monomer, when the polymerization of the monomer proceeds up to a point called the phase inversion point, the dissolved rubber begins to precipitate and the precipitate increases in quantity within a relatively short period of time to form large rubber phase particles whereby the homogeneity of the resulting copolymer is very poor. Accordingly, molded products prepared from the copolymer have very poor surface gloss and strength.

Therefore, to avoid this problem it is considered to be necessary to grind or effect a particle size reduction of the precipitated rubber phase particles to a desired small average particle size. There has been known, for example, a process disclosed in Japanese Patent Publication No. 17062/1964 wherein a part of the composition is taken from the polymerization tank and is introduced into a high shear device having fixed blades and turbine blades which rotate at a high speed. The aforementioned part of the composition is subjected to a very high shearing force treatment at a mean shear rate of about 38,000 sec$^{-1}$. The flow velocity of the composition through the shear device is such that 3% of the polymerization reaction mixture is treated in the device per minute to disperse the rubber phase. The high shearing force is applied only after the reaction mixture has passed the phase inversion point.

In an invention disclosed in the Official Gazette of Japanese Patent Publication No. 34150/1970, grinding and size regulation of the rubber phase particles are effected by applying compressing force, centrifugal force and grinding force to a polymerization liquid by means of a grinding mechanism and a perforate baffle plate mechanism, both located so that the entirety of the polymerization reaction mixture repeatedly flows therethrough.

ABS resin consists essentially of a continuous resin phase and rubber phase particles uniformly distributed in the continuous phase. This heterogeneity accounts for the physical properties of ABS resin.

Particularly, the impact strength and surface gloss depend on the size of the rubber phase particles. As the particle size is increased, the impact strength is increased. The surface gloss is improved as the size of the rubber phase particles becomes smaller. Of course, the physical properties of the resin also are influenced by various chemical conditions during the preparation of the resin, in addition to the size of the rubber phase particles.

In the above-mentioned two inventions it is intended to attain a favorable balance of the properties of impact strength and surface gloss by reducing the average particle size of the rubber phase particles by cutting and grinding the rubber phase particles during the bulk polymerization step.

Accordingly, in these processes, the favorable balance may be lost because of some change in the preparation conditions. Because of these circumstances, development of a process which can be performed stably on a commercial scale has been desired.

After intensive investigations for the purpose of developing a stable process which can be performed on a commercial scale, the inventors have found that the grinding of the rubber phase particles to an average particle size of a specified value is not sufficient to fully determine and control the properties of the resin.

It has been found further that in order to obtain a homogeneous polymer from which a molded product of a high quality can be produced, it is unnecessary to grind the rubber phase particles by means of a powerful shearing device or mechanism, which has hitherto been considered to be indispensable in order to subdivide or grind the rubber phase particles. We have found that a relatively low shearing rate provides a satisfactory effect, provided that such shearing is applied repeatedly to the entire polymerization reaction mixture a sufficient number of times.

SUMMARY OF THE INVENTION

The process of the present invention comprises polymerizing a solution of from 2 to 20 parts by weight of a synthetic butadiene rubber dissolved in 100 parts by weight of a monovinyl aromatic monomer or a monomer mixture comprising a monovinyl aromatic monomer and a monomer copolymerizable with the monovinyl aromatic monomer, under the conventional bulk polymerization conditions. The entirety of the polymerization reaction liquid is continuously circulated in unidirectional, non-turbulent, piston-like flow beginning at the latest after the commencement of phase inversion in the polymerization liquid. The entire polymerization reaction liquid is circulated at a rate of 4–36 circulations/min. through a shear zone in which there is imposed on the liquid a mean shear rate of 40 to 450 sec.$^{-1}$. Water and a suspension stabilizer are added to the polymerization liquid after the conversions of monomer to polymer therein has reached 10 to 40% and the polymerization is continued under usual suspension polymerization conditions.

DETAILED DESCRIPTION OF THE INVENTION

Figure 1:
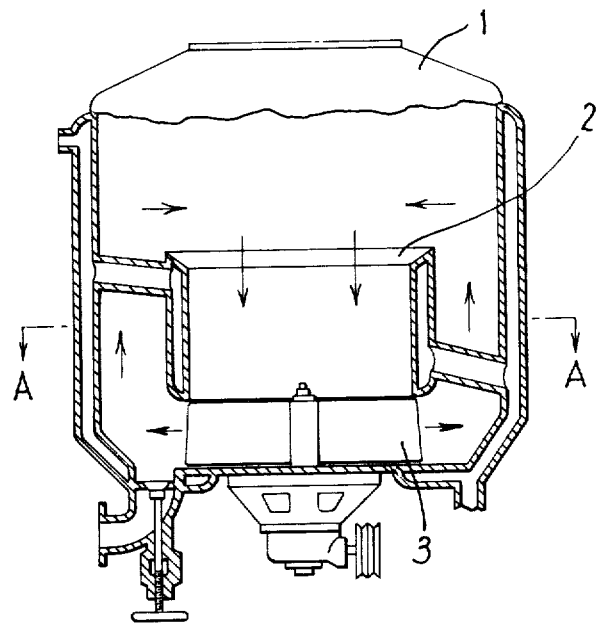
FIG. 1 is a vertical cross section of an apparatus for carrying out the present invention.
Figure 2:
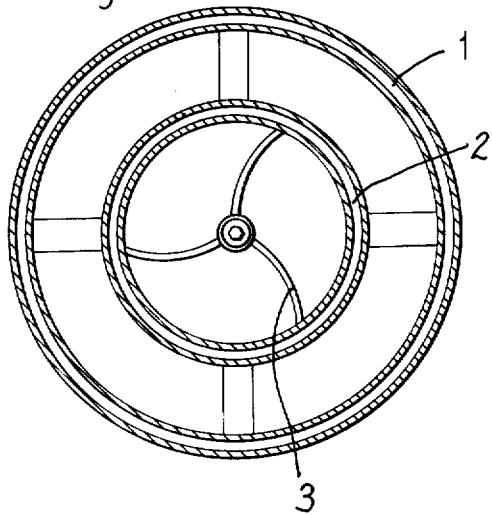
FIG. 2 is a section view taken along line A—A of FIG. 1.
Figure 3:
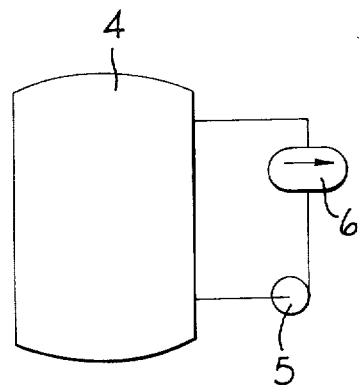
FIG. 3 is a schematic drawing of an apparatus used for conventional processes, which is illustrated for the purposes of comparison.

In FIGS. 1 and 2, 1 is a vertical cylindrical reaction vessel, 2 is an inner cylinder and 3 is a turbine-type rotary impeller. In FIG. 3, 4 is a polymerization tank, 5 is a pump and 6 is a high shear agitator device.

It is critical in the process of the present invention to effect the shearing of the rubber phase particles repeatedly under unidirectional laminar flow conditions. For this purpose, it is necessary to circulate the entirety of the polymerization liquid uniformly, because irregular flow of the polymerization liquid makes effective repetition of the shearing impossible. Also it causes non-uniform particle size reduction of the rubber phase particles. The time required for each cycle of circulation of any given part of the circulating polymerization liquid must be equal. In other words, substantially unidirectional, non-turbulent, laminar flow of the circulating polymerization liquid is necessary. This type of flow is hereinafter referred to as "piston" flow. In strict theoretical sense, such piston flow cannot be achieved in practice and it will be understood that this term is employed for convenience to indicate a state of flow in which the magnitude of eddy currents or turbulence is maintained at as low a level as possible.

The piston flow in this invention refers to a flow which can be produced by preparing a passage with an inner tubular baffle plate concentrically located to the vessel wall, such as inner cylinder 2 shown in FIG. 1. This type of flow cannot be obtained by the procedures described in the above-mentioned prior publications. For example, when stirring with a conventional stirrer of the anchor type, the liquid is stirred irregularly and uniform piston-like circulation cannot be attained. If a circulation device is provided outside of the polymerization tank as disclosed in the specification of Japanese Patent Publication No. 17062/1964, the liquid returned into the polymerization tank through the external circulation device is mixed randomly with the liquid in the tank and another portion of the liquid then is again drawn into the external circulation device. Thus, uniform piston-like circulation of the entire quantity of the polymerization liquid cannot be obtained. According to the process disclosed in Japanese Patent Publication No. 34150/1970, the flow of the polymerization liquid passes as two separate streams through two shearing zones to cause non-uniform grinding. In addition, the flow of the two streams changes in response to external factors such as a slight change in polymerization conditions. Therefore, the external factors must be controlled precisely in order to obtain therefrom polymers of stable uniform quality and properties.

A shearing force may be applied uniformly to the polymerization liquid for a very long period of time in said known process. However, within a limited time, although a shearing force is applied to some part of the rubber phase particles repeatedly, no shearing force is applied to the other part; rather, the latter part circulates as an entrained stream. Thus, the shearing force applied to the rubber phase particles becomes non-uniform inevitably.

In the present invention, a restriction is imposed on the shear conditions as a consequence of the polymerization conditions, because the invention comprises both polymerization and shearing carried out simultaneously. If the polymerization is carried out under only bulk polymerization conditions, the viscosity of the polymerization liquid increases as the polymerization reaction proceeds. In the so-called bulk-suspension, two step polymerization technique employed in the present invention, wherein the bulk polymerization is terminated at a suitable point, and then suspension polymerization is effected thereafter, the total bulk polymerization time is limited. It is necessary to apply a uniform shearing force in each circulation cycle of the entire polymerization liquid by circulating the entirety of the polymerization liquid under substantial piston flow conditions through the shearing zone for attaining the stated purpose within the limited time that is available. The circulation of the polymerization liquid is effected at such a rate that the entirety of the polymerization liquid passes through the shear zone at least 4 times per minute and not more than 36 times per minute. For determining the number of circulation cycles per minute appropriate for any given polymerization liquid, due regard must be paid to the rubber content, the polymerization conditions and the shape of the device. The number of circulation cycles is fixed generally depending on rubber content $(x)$ expressed in wt. % within the following range, in order to obtain good results:

$-0.064x^2 + 3x + 6 >$ number of cycles of circulation of the entire polymerization liquid per minute $> -0.064x^2 + 3x - 10$.

The number of cycles is 4–20/minute at 5 (wt.) % rubber content, 14–30/minute at 10% and 20–35/minute at 15%.

The above number of circulation cycles is attained under a standard polymerization condition, namely, a polymerization rate, i.e. rate of conversion of monomer to polymer, of about 3–5%/hr. Precisely, a total number of circulations in the range of 200 to 2200 must be carried out during the period (about one hour), starting from the time phase inversion commenced, in which the conversion increases to a value 4 to 35% higher than the conversion at the time of phase inversion. More precisely, the total number of circulations of the entirety of the polymerization liquid during the above period must be higher than that calculated by the following formula, according to rubber content $(x)$ within said period of time:

$-3.84x^2 + 180x - 600$

If there is employed a high shear agitator device in an external circulation system as shown in FIG. 3, it is difficult to maintain a circulation velocity above about 0.03 cycles/minute because such devices have low flow rates. Moreover, uniform circulation cannot be obtained as above described. Consequently, the rubber phase particle size distribution is non-uniform and the surface gloss of the resulting polymer is poor (as is shown in Comparative Example 2 in Table 1, below).

On the other hand, according to the process of the present invention, the particle size distribution of the rubber phase particles can be made more uniform, which is unexpected, and consequently, molded products of excellent impact strength and surface gloss are obtained.

According to an analysis with respect to rubber phase particle size made by the inventors, the impact strength depends upon the average particle size of the rubber phase particles and the surface gloss depends upon the particle size distribution of the rubber phase particles. The average particle size depends upon the strength of the shearing force employed and the particle size distribution depends upon the number of times that the polymerization reaction mixture undergoes shear.

Although previously it has been considered that it is impossible to control or regulate impact strength and surface gloss separately, surprisingly it has been found that they can be controlled or regulated independently by the practice of the present invention. Thus, by the present invention, the design criteria for the polymerization apparatus are clarified and selection of appropriate polymerization conditions including the operating conditions of the apparatus is facilitated. Therefore, the apparatus can be designed and manufactured at a reasonable cost and the production and maintenance of the apparatus are easy.

The mean shear rate applied on the polymerization reaction mixture in the shearing zone in the process of the present invention is in the range of 40 to 450 sec.$^{-1}$ (mean shear rate $\bar{\gamma}$). Sufficient shear for the polymer composition, according to the present invention, can be lower than the shear rate applied to the polymerization liquid by the periphery of rotary blades of the paddle type rotating at a peripheral velocity of 1,000 m/min. Thus the shear rate is of a low level of about from 1/10 to 1/100 of the shearing rate applied by conventional grinding mechanisms.

The mean shear rate is calculated from the power consumption required for stirring in actual polymerization operations according to the following formula:

mean shear rate $= 2.7 \ \sqrt{Pv \ g_c/\mu}$ $Pv$: Power consumption per unit volume
[Kg/sec. m$^2$]

$g_c$: Gravitational conversion factor
[kg.m/Kg.sec$^2$]

$\mu$: Viscosity.
[kg/m.sec]

In the practice of the present invention, the rate of circulation of the polymerization liquid is preferably 10 to 30 circulations per minute and more preferably 15 to 25 circulations per minute, and the mean shear rate is preferably 50 to 300 sec$^{-1}$ and more preferably 60 to 200 sec$^{-1}$.

A suitable apparatus for carrying out the process of the present invention is shown in FIGS. 1 and 2. In this apparatus, an inner cylinder 2 is disposed concentrically inside of a vertical cylindrical vessel 1. A rotary turbine-type impeller 3 is provided between the lower end of the cylinder 2 and the bottom of the vessel and in concentric relationship therewith. The diameter of the impeller 3 is substantially the same as the internal diameter of the inner cylinder 2.

The purpose of the invention can be attained by using other apparatuses than the apparatus described above. There can be used any apparatus having one or more than one circulation passage which provides nearly equal time of circulation, which apparatus also includes a shearing zone extending substantially entirely across the entirety of the passage(s), i.e. the locus of the surface of the peripheries of the blades extends to the wall of the passage. The operating conditions can be determined easily by those skilled in the art. That is, the various elements of the device can be selected readily so that the peripheral velocity of the rotary blades is below 1000 m/min. and the circulation velocity of the entirety of the polymerization liquid through the shearing zone is 4-36 circulations/min.

Passages for cooling medium and/or heating medium can be provided in the wall of the vessel 1 and/or the wall of the inner cylinder 2 for regulating the temperature.

A turbine-type impeller suitable for the purpose of the present invention is one of the flat blade or curved blade type, that is, a radial flow turbine impeller. Pitched blade turbine impellers are not satisfactory. Suitable turbine type impellers are shown on page 1099 of "Kagaku Kogyo Binran (Handbook of Chemical Technology)" edited by Kagaku Kogyo Kyokai and published on May 10, 1968. Preferably, the peripheral edge of the blade is linear. Also, it is preferred to use hub-mounted curved blades which are curved on the same radius. However, irregularly curved blades or flat blades can also be used. It is sufficient if the impeller has two blades, but the efficiency of shearing in one cycle of circulation increases as the number of blades is increased.

The shearing efficiency is increased also by providing a cylindrical perforate plate surrounding the periphery of the rotary impeller, and disposed concentric with the axis of rotation thereof. In such a case, care must be taken, because the shearing force is increased too much if the clearance between the perforate plate and the periphery of the rotary blades is less than 1 mm.

The process of the present invention is characterized by the fact that such a high shearing force is not required or desired. The clearance between the perforate plate and the peripheries of the rotary blades must be more than 1 mm so as not to exert an influence on the shearing force applied by said blades.

It is considered that the action of the perforate plate is to prolong the time required for passing the polymerization liquid through the shearing zone and to increase the efficiency of shearing in each cycle of circulation.

The shear must be applied by rotation of the impeller 3 beginning at least by the time that phase inversion occurs. The impeller 3 can be rotated to apply shear earlier in the bulk polymerization stage, if desired, but this is not necessary. The rotation of the impeller 3 will be continued until the conversion of monomer to polymer has increased 4 to 35 percent in comparison with the conversion at the commencement of phase inversion.

Typical polymers to which the process of the present invention can be applied are ABS resin and high impact polystyrene. As synthetic rubbers, there can be mentioned, for example, polybutadiene, butadiene-styrene copolymer rubber and butadiene-acrylonitrile copolymer rubber.

As monovinyl aromatic monomers, there can be used styrene, 2-methylstyrene, nucleus-substituted alkylstyrenes and nucleus-substituted chlorostyrenes. Monomers copolymerizable with the monovinyl aromatic monomers are acrylonitrile, methacrylonitrile, methacrylates such as methyl methacrylate, and acrylates.

With regard to the bulk polymerization conditions, conventional known conditions such as those described in the Official Gazette of Japanese Patent Publication No. 34150/1970 can be employed. Additives such as a plasticizer and stabilizer can be incorporated in the polymerization system, in addition to a polymerization initiator and polymerization degree-regulating agent. The purpose of the invention is not damaged even if the polymerization is carried out under conditions close to solution polymerization by adding a solvent. The bulk polymerization of the present invention involves also polymerization in heterogeneous systems in the presence of a quantity of water and, if necessary, as surfactant of the oil-in-water type.

The suspension polymerization which follows the bulk polymerization can be carried out under such known conditions as described in the above-mentioned Japanese Patent Publication No. 34150/1970.

The present invention will be further described by reference to the following illustrative examples.

EXAMPLE 1

In a monomer mixture comprising 49 kg of styrene and 21 kg of acrylonitrile, were dissolved 3.5 kg of butadiene-styrene copolymer rubber prepared by solution polymerization (styrene content 25%). The solution was charged into a polymerization apparatus having a tank diameter of 0.77 m, an impeller diameter of 0.477 m and rotary blade height of 0.104 m as shown in FIGS. 1 and 2. The height of the solution in the tank was 0.26 m. Successively, 110 g of benzoyl peroxide and 60 g of dicumyl peroxide as polymerization initiators, 240 g tert.dodecylmercaptan as molecular weight regulating agent and 2.1 kg of a plasticizer were charged. The whole mixture was stirred thoroughly to obtain a solution. Further, 14 kg of deionized water were added thereto for the purposes of reducing the apparent viscosity of the polymerization system and of facilitating temperature control. After replacing the atmosphere in the apparatus by nitrogen, the temperature was elevated and the reaction was carried out at 70°C for 4 hours, the mean shear rate and circulation number (circulation cycles) being as shown in Table 1 given below. When conversion reached about 30%, the content of the tank was transferred into another suspension polymerization apparatus and suspension polymerization was carried out. The suspension polymerization device was provided with a stirrer, baffle plates and a jacket, and into it had been charged a suspension of a dispersing agent of the following composition:

| Deionized water | 126 kg |
| Fine powder of magnesium hydroxide | 7 kg |
| Sodium dodecylbenzene sulfonate | 3.5 kg |

After transfer of the bulk polymerization liquid followed by nitrogen replacement, the temperature was elevated and the suspension polymerization was carried out at 130°C for 5 hours. After the polymerization was completed substantially, the product was cooled and magnesium hydroxide was decomposed with hydrochloric acid. The polymer beads were washed with water, dehydrated and dried to obtain pearly polymer. The polymer was then mixed with a stabilizer and extruded to obtain pellets. The pellets were then injection molded to obtain test pieces. The physical properties of the resin were determined. Some test pieces were dyed with osmium tetraoxide and cut to obtain extremely thin pieces. By electron microscope photography, the average rubber phase particle diameter and the rubber phase particle diameter distribution were determined. The diameters of 500 - 1000 rubber phase particles were determined from 10 sheets of the photographs taken from different spots. For elliptical particles, the arithmetic mean of the larger diameter and the shorter diameter was employed. It was assumed that electron microscope photographs of the rubber phase particles were cut at the center of the rubber phase particles. Number average particle diameter $d_N$ of the rubber phase particles was calculated according to the following equation:

$$d_N = \Sigma\, Nidi/Ni$$

wherein $Ni$ represents number of particles having particle diameter $di$.

Degree of particle diameter distribution is represented by standard deviation ($\delta$) which was calculated by the following equation:

$$\delta = [\Sigma\, Ni\, (di - d_N)^2/\Sigma\, Ni\,]1/2$$

Symmetry of the particle diameter distribution is represented by the arithmetical quartile skewness ($Sa$) which was calculated by the following equation:

$$Sa = \tfrac{1}{2}\, (d_{1q} + d_{3q}) - d_{med}$$

$d_{1q}$: first quartile diameter
$d_{3q}$: third quartile diameter where $d_{1q}$, $d_{3q}$ and $d_{med}$ represent rubber phase particle diameters corresponding to 25%, 75% and 50%, respectively, in a drawing showing the relationship between rubber particle diameter and cumulative rubber particle number (%).

The results were as shown in Table 1.

Preparation of test pieces and observation of the rubber phase particles in the following examples and comparative examples were effected in the same manner as in Example 1.

EXAMPLES 2 and 3

The procedures of Example 1 were repeated except that the amount of butadiene-styrene copolymer rubber used was 10.5 kg and the shear rate and circulation number were changed. The results were as shown in Table 1.

EXAMPLE 4

The procedures of Example 2 were repeated by using the apparatus used in Example 1 but provided further with a cylindrical perforate plate of pore diameter of 5 mm outside the rotary blades, the sum of the pore areas being larger than the cross-sectional area of the inner cylinder 2, and the clearance between the blade 3 and the plate being 20 mm. As shown in Table 1, the rubber phase particle diameter distribution was uniform and surface gloss was improved as compared with those of Example 2.

COMPARATIVE EXAMPLE 1

The same procedures as in Example 1 were repeated except that rate of rotation of the rotary blades was reduced to reduce the number of circulations of the polymerization liquid. The results are shown in Table 1. The surface gloss was reduced remarkably.

COMPARATIVE EXAMPLE 2

By using an apparatus as shown in FIG. 3, test pieces were prepared under the same conditions (composition of the liquid charged, polymerization temperature and polymerization time) as in Example 2.

The apparatus shown in FIG. 3 is similar to an embodiment of a prior apparatus shown in the Official Gazette of said Japanese Publication No. 17062/1964. The polymerization tank 4 is a reaction tank providing only the function of temperature control, but it applies substantially no shear on the polymerization liquid. In this apparatus, an outer circulation system comprising a pump 5 to which substantially no shearing power is applied is connected by a pipe with a high shearing device 6 comprising a rotary blade and a fixed blade. The capacity of the pump was 0.02 m³/min. The shear rate of the high shear device 6 was 38,000/sec.$^{-1}$. The properties of the ABS resin obtained under the above conditions were as shown in Table 1. As compared with those of Examples 2–4, the average particle diameter of rubber is the same but the rubber particle diameter distribution (standard deviation) was broader, the symmetry of the distribution was far inferior (distribution of Poisson type) and the physical properties were inferior. The tensile strength and surface gloss were also inferior.

COMPARATIVE EXAMPLE 3

By using a polymerization apparatus as shown in FIG. 1 having tank diameter of 0.77 m, rotary blade diameter of 0.312 m and rotary blade height of 0.117 m, test pieces were obtained in the same manner as in Example 1 at a rotary blade peripheral velocity of 150 m/min and a circulation number of 3.5. As shown in Table 1, the product had a poor surface gloss.

In the Examples and Comparative Examples, the rotation of the impeller was continued throughout the entire period of the bulk polymerization step.

EXAMPLE 5

In a monomer mixture comprising 21 kg of styrene, 21 kg of acrylonitrile and 28 kg of α-methylstyrene, were dissolved 9 kg of butadiene-styrene copolymer rubber prepared by solution polymerization type (styrene content: 25%). The solution was charged into a polymerization tank as shown in FIG. 1. Successively, 280 g of benzoyl peroxide and 140 g of dicumyl peroxide were charged as polymerization initiator. The whole mixture was stirred thoroughly to obtain a solution. Further, 14 kg of deionized water were added thereto for the purposes of reducing apparent viscosity and of facilitating the temperature control. After replacement with nitrogen, the temperature was elevated and the polymerization reaction was carried out at 75°C for 4.5 hours under the same conditions as in Example 3.

About 30% of the monomers was thus polymerized. The product was further subjected to suspension polymerization at 130°C for 5 hours in the same manner as in Example 1. The polymerization was thus substantially completed. The physical properties of the polymer were as shown in Table 2.

EXAMPLE 6

In 70 kg of styrene, 4.9 kg of polybutadiene of the solution polymerization type were dissolved and the solution was charged in a reaction tank as shown in FIG. 1. Thereafter, 140 g of benzoyl peroxide as polymerization initiator, 56 g of dicumyl peroxide, 28 g of tert-dodecylmercaptan and 2.1 kg of plasticizer were introduced therein and the whole was stirred thoroughly to obtain a solution. Further, 14 kg of deionized water were added thereto for the purpose of reducing apparent viscosity and of facilitating the temperature control. After replacement with nitrogen, the temperature was elevated.

Then polymerization was carried out at 85°C for 4 hours under the same conditions as in Example 2. After 40% of the monomers was polymerized, suspension polymerization was carried out at 120°C for 6 hours and then at 130°C for 4 hours in the same manner as in Example 1.

The physical properties of the resulting polymer were as shown in Table 2.

Table 1

| | | Mean shear rate (sec.$^{-1}$) | Circulation number (per minute) | Tensile strength (kg/cm²) | Impact strength (kg-cm/cm) | Surface gloss (%) | Rubber phase particle | | |
|---|---|---|---|---|---|---|---|---|---|
| | | | | | | | Number average diameter (μ) | Standard deviation of particle diameter distribution | Symmetry of particle diameter distribution |
| Example | 1 | 45.2 | 10 | 620 | 7.5 | 92 | — | — | — |
| | 2 | 78.4 | 19 | 485 | 16 | 88 | 0.8 | 0.23 | 0.03 |
| | 3 | 115.8 | 24 | 480 | 16 | 93 | 0.7 | 0.25 | 0.04 |
| | 4 | 78.4 | 19 | 487 | 15 | 93 | 0.65 | 0.20 | 0.03 |
| Comparative Example | 1 | 11 | 3 | 618 | 7.8 | 41 | — | — | — |
| | 2 | 3600 | 0.03 | 420 | 15 | 75 | 0.7 | 0.5 | 0.5 |
| | 3 | 45.2 | 3.5 | 610 | 7.6 | 48 | — | — | — |

Note: Methods of measurement of physical properties:
Tensile strength: ASTM D-638 Impact strength: ASTM D-256 (Izod)
Surface gloss: Gloss meter of Murakami Shikizai Co., Ltd.

Table 2

| | Tensile strength (kg/cm²) | Impact strength (kg-cm/cm) | Surface gloss (%) |
|---|---|---|---|
| Example 5 | 480 | 9 | 85 |
| Example 6 | 330 | 7 | 80 |

In such a stirring as will be usually called "strong stirring", the power consumption required for stirring is 0.75 to 2.2 KW/m³, while in the process of the present invention, the power consumption is very great, for example, 27.0 KW/m³ in Example 2. Turbine-type impellers are usually used in connection with liquids having low viscosities and they are not used in connection with viscous liquids to be treated in the process of the present invention, where the power consumption for stirring such liquids will be necessarily very much increased. However, the purpose of the present invention can be accomplished by the use of such turbine-type impellers.

According to the present invention, resin products having an uniform particle size distribution of the rubber phase particles can be obtained, which has a small standard deviation of particle diameter distribution of less than 0.3 and a small symmetry of particle diameter distribution of less than 0.1, preferably less than 0.05. Thus, as exemplified in the above Examples, the impact strength and the surface gloss of the resulting polymer can be maintained at unexpected high levels.

The embodiments of the invention in which an exclusive property or privilege is claimed are defined as follows:

1. In a process for preparing rubber-containing styrene resins, in which a solution of (A) from 2 to 20 parts by weight of butadiene synthetic rubber, dissolved in (B) 100 parts by weight of monovinyl aromatic monomer or monomer mixture comprising monovinyl aromatic monomer and monomer copolymerizable therewith, is subjected to bulk polymerization at least until phase inversion has occurred and then is subjected to suspension polymerization to obtain the resin product, in which the bulk polymerization is carried out in a vessel having wall means defining a circulatory flow path for the solution undergoing polymerization and having an impeller for effecting circulatory flow of the solution through said path and imposing shear on the rubber particles that form in the solution during bulk polymerization, the improvement in the bulk polymerization step which consists essentially of rotating said impeller beginning at the latest by the time when phase inversion commences, and thereby continuously and repeatedly circulating the entirety of the polymerization liquid during the remainder of the bulk polymerization step in unidirectional, non-turbulent, laminar flow through a shear zone at a uniform rate of from 4 to 36 circulations per minute of the entirety of the polymerization liquid and in the range calculated by the formula $-0.064x^2+3x+6 >$ number of cycles of circulation of the entire polymerization liquid per minute $> -0.064x^2+3x-10$, wherein $x$ is the weight of rubber dissolved in 100 parts of (B), said shear zone being defined by a radial flow turbine impeller whose blades extend substantially to the wall of said path whereby said shear zone extends substantially entirely across said path so that as the polymerization liquid moves unidirectionally through the shear zone its direction of flow is changed by said blades from a direction parallel to the axis of rotation of said impeller to a direction radially thereof, and said polymerization liquid is simultaneously subjected to a uniform shear force at a mean shear rate of from 60 to 200 $\sec^{-1}$ wherein mean shear rate = $2.7 \sqrt{P_v G_c/\mu}$ in which $P_v$ = power consumption for operating the impeller per unit volume of the polymerization liquid, in units Kg/sec. m$^2$ $G_c$ = gravitation conversion factor, in units Kg . m/Kg . sec$^2$ $\mu$ = viscosity of polymerization liquid, in units Kg/m . sec the rotation of the impeller being continued until the conversion of monomer to polymer has increased from 4 to 35 percent more than said conversion at the time of commencement of phase inversion in the polymerization liquid and the entirety of said polymerization liquid has been circulated through said shear zone from 200 to 2200 times and is higher than the value calculated from the formula $-3.84x^2+180x-600$, wherein $x$ has the same meaning as defined above.

2. A process according to claim 1, wherein the monovinyl aromatic monomer is styrene.

3. A process according to claim 1, wherein the monovinyl aromatic monomer is styrene and the monomer copolymerizable with the monovinyl aromatic monomer is acrylonitrile.

4. A process according to claim 1, wherein the synthetic rubber is polybutadiene.

5. A process according to claim 1, wherein the synthetic rubber is butadiene copolymer rubber.

6. A process according to claim 1, in which the circulation and shear are effected by rotating a radial flow, flat non-pitched blade or curved non-pitched blade impeller mounted adjacent the bottom wall of the reaction vessel to direct the polymerization reaction liquid to the wall of the vessel, thence upwardly along said wall, thence toward the center of the vessel and then downwardly through an inner cylinder having substantially the same diameter as the impeller.

7. A process according to claim 1, wherein the rate of circulating the polymerization liquid is from 10 to 30 circulations/min.

8. A process according to claim 1, wherein the rate of circulating the polymerization liquid is from 15 to 25 circulations/min.

* * * * *